(12) United States Patent
Oetiker et al.

(10) Patent No.: US 11,579,097 B2
(45) Date of Patent: Feb. 14, 2023

(54) LOCALIZATION METHOD AND SYSTEM FOR MOBILE REMOTE INSPECTION AND/OR MANIPULATION TOOLS IN CONFINED SPACES

(71) Applicant: Baker Hughes Holdings LLC, Houston, TX (US)

(72) Inventors: Moritz Oetiker, Zürich (CH); Tobias Neukom, Brugg (CH); Nitish Jha, Turgi (CH)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/220,428

(22) Filed: Apr. 1, 2021

(65) Prior Publication Data
US 2021/0310962 A1 Oct. 7, 2021

(30) Foreign Application Priority Data

Apr. 6, 2020 (EP) ..................................... 20168248

(51) Int. Cl.
*G06T 7/70* (2017.01)
*G01N 21/954* (2006.01)
(Continued)

(52) U.S. Cl.
CPC ........... *G01N 21/954* (2013.01); *F17C 13/02* (2013.01); *G01S 17/894* (2020.01);
(Continued)

(58) Field of Classification Search
CPC ....... G01N 21/954; G06T 7/70; G01S 17/894; F17C 13/02; G05D 1/0251
(Continued)

(56) References Cited

U.S. PATENT DOCUMENTS

| 7,162,338 B2 | 1/2007 | Goncalves et al. |
| 8,793,020 B2 | 7/2014 | Chiappetta et al. |

(Continued)

FOREIGN PATENT DOCUMENTS

| CA | 2915167 A1 | 12/2014 |
| EP | 3104194 A1 | 12/2016 |

(Continued)

*Primary Examiner* — Nguyen T Truong
(74) *Attorney, Agent, or Firm* — Mintz Levin Cohn Ferris Glovsky and Popeo, P.C.

(57) ABSTRACT

A localization method and system for mobile remote inspection and/or manipulation tools in confined spaces are provided. The system comprises a mobile remote inspection and/or manipulation device including a carrier movable within the confined space and an inspection and/or manipulation tool, such as an inspection camera, pose sensors arranged on the movable carrier for providing signals indicative of the position and orientation of the movable carrier, and distance sensors arranged on the movable carrier for providing signals indicative of the distance to interior surfaces of the confined space. The localization method makes use of probalistic sensor fusion of the measurement data provided by the pose sensors and the distance sensors in order to precisely determine the actual pose of the movable carrier and localize data generated by the inspection and/or manipulation tool.

14 Claims, 7 Drawing Sheets

(51) Int. Cl.
*G01S 17/894* (2020.01)
*F17C 13/02* (2006.01)
*G05D 1/02* (2020.01)

(52) U.S. Cl.
CPC .......... *G05D 1/0251* (2013.01); *G06T 7/70* (2017.01); *G01N 2201/0216* (2013.01); *G05D 2201/0207* (2013.01); *G06T 2207/30244* (2013.01)

(58) Field of Classification Search
USPC ........................................................ 348/82
See application file for complete search history.

(56) References Cited

U.S. PATENT DOCUMENTS

| | | | |
|---|---|---|---|
| 9,641,981 | B2 | 5/2017 | Abu-Alqumsan et al. |
| 2003/0030398 | A1 | 2/2003 | Bancroft et al. |
| 2004/0107080 | A1* | 6/2004 | Deichmann .......... H04R 25/652 |
| | | | 703/6 |
| 2010/0284621 | A1 | 11/2010 | Goncalves et al. |
| 2013/0210457 | A1 | 8/2013 | Kummetz |
| 2015/0281910 | A1 | 10/2015 | Choudhury et al. |
| 2017/0265041 | A1 | 9/2017 | Mahasenan et al. |
| 2019/0242728 | A1* | 8/2019 | Low ....................... G01B 11/24 |

FOREIGN PATENT DOCUMENTS

| | | |
|---|---|---|
| WO | 2004/059900 A2 | 7/2004 |
| WO | 2016/118499 A1 | 7/2016 |
| WO | 2016/162568 A1 | 10/2016 |

\* cited by examiner

LOCALIZATION METHOD AND SYSTEM FOR MOBILE REMOTE INSPECTION AND/OR MANIPULATION TOOLS IN CONFINED SPACES

CROSS-REFERENCE TO RELATED APPLICATIONS

This application claims priority pursuant to 35 U.S.C. 119(a) of Europe Patent Application No. 20168248.1, filed Apr. 6, 2020, which application is incorporated herein by reference in its entirety.

FIELD OF THE INVENTION

The present invention relates to a localization method and system for mobile remote inspection and/or manipulation tools in confined spaces.

BACKGROUND

Many industrial equipment, systems, machineries and infrastructures require periodic visual inspection and maintenance. Visual inspection may be required to detect defects in materials, such as corrosion in iron and steel components, cracks in walls or other structural components. These inspections are typically done by experienced inspection personnel which employs eyesight or special contactless and contact measurement devices, like for instance thermal or multispectral cameras, ultrasonic sensors, or eddy current sensors. Such inspection operations may be complex and time consuming and need some special facilities. Furthermore, such inspections need sometimes to be carried out in hazardous environments or in confined spaces, where the access may be difficult and the working conditions may be dangerous or unhealthy for a human being. In addition, the whole system or plant needs sometimes to be shut down in order to allow inspection or maintenance of its components. For example, pressure vessels, storage tanks and boilers used in power plants, refineries and various other industrial installations may be difficult to inspect or maintain, since they may include dangerous gases or liquids, sometimes at pressures above the ambient pressure. Such fluids would need to be emptied first for inspection or maintenance leading to downtime of the entire plant.

Recently, robots and other mobile remote devices have been introduced into inspection and maintenance processes, which may operate semi- or fully autonomously to perform services, including inspection, maintenance and manipulation. For example, magnetic climbing robots, so-called crawlers, have been developed, which have magnetic wheels and are able to climb metallic walls or structures, e.g. the walls of ships. The climbing robots may carry an inspection camera that can capture images of the wall or structure, which can be used to detect defects in the wall. It is also customary to use inspection cameras or sensors mounted on movable manipulators, such as hand-held poles or actuated robotic arms, to inspect confined spaces.

It is important or necessary to know the exact location of the place, which is currently inspected, maintained or manipulated. For example, inspection data captured by the camera needs to be localized in absolute coordinates, be it to track gradual changes over time or simply to allow the maintenance personnel, e.g. using automized maintenance tools, to perform repairs or other maintenance work at the exact place. The captured data might in some cases need to be localized with an accuracy of less than a centimeter up to only a few centimeters in order to enable the operators to uniquely identify the places in which maintenance work should be carried out.

Such localization of sensed or captured data may be difficult in confined spaces, where a robot or other remote device is applied, since there may be no coverage of global localization systems, like GPS, which would allow the robot or remote device to know its exact position. The robot or remote inspection and/or maintenance device must carry a number of sensors to perform the inspections and/or maintenance tasks, like cameras for visual imaging with artificial illumination, 3D scanning sensors, ultrasound sensors, structured light profiling sensors and the like, to facilitate impairment detection and also needs to carry additional sensors for self-localization and navigation. All these sensors increase the weight of the system and also require power for operation, which in case of battery operated vehicles reduces the power autonomy time. Therefore, it is desired to reduce the complexity and power requirements for sensors used for self-localization and navigation of the inspection and/or maintenance robots or remote devices.

Moreover, there are some issues associated with localizing a robot or other remote inspection and/or maintenance device navigating through the confined space in absolute global geographical coordinates based on the integrated sensors. Most such systems rely on odometry information from wheel encoders, for example. However, humidity and dirt on the walls within the confined space may significantly decrease the grip of the robot wheels, distorting the computed linear and angular velocities based on the wheel encoders. There may also be certain obstacles on the interior surfaces of the confined space, which the robot must overcome and in this process, the robot can lose wheels grip, further distorting the wheel odometry to a greater extent. Such odometry errors can accumulate in the course of a mission, greatly distorting the calculated pose, i.e. position and orientation, of the robot with respect to the global geographical coordinates. Typical sensor errors of such wheel encoders and inertial units are also integrated during the mission, thereby further reducing reliability of any determined localization data.

Conventional localization solutions sometimes use external references or beacons, e.g. radio frequency, infrared, ultrasound beacons, reflectors, etc., or receivers, at known locations or visual feature detection, but such features or beacons increase complexity of the system and may not be available in all confined spaces. Methods or systems, which make use of beacons or visual features for localization, are known from US 2013/0210457 A1, U.S. Pat. No. 9,641,981 B2, CA 2 915 167 A1, US 2015/0281910 A1, U.S. Pat. No. 7,162,338 B2, US 2010/0284621 A1, WO 2004/059900 A2 and US 2017/0265041 A1, for example.

EP 3 104 194 A1 discloses a robotic vacuum cleaner with a robot positioning system which uses a laser to illuminate a space by projecting vertical laser lines within a field of view of a camera. The robot positioning system only considers image data recorded along a planar surface achieved by the vertical laser lines projected by the line laser.

U.S. Pat. No. 8,793,020 B2 discloses a navigational control system for a robotic device operating in a defined working area comprising means for emitting a number of directed beams having predetermined emission patterns and a set of detection units positioned within the defined working area in a known spaced apart relationship and operative to detect one or more of the emitted directed beams.

There are also robotic systems which build online a map of the environment from sensor data, e.g. captured visual images, scans from laser range finder devices, in particular LIDAR (light detection and ranging) devices, magnetic footprints, WIFI footprints, etc., and perform a so-called SLAM (simultaneous localization and mapping) process. For example, WO 2016/162568 A1 discloses a method for constructing a 3D reference map useable in real-time mapping, localization and/or change analysis, wherein the 3D reference map is built using a 3D SLAM framework based on a mobile laser range scanner. Such SLAM-based mobile laser scanning devices require large sensors, while providing reduced model quality and do not provide full information about the environment to the operator from the start.

WO 2016/118499 A1 discloses a visual localization method and system for autonomous self-driving cars using a visual camera system, which access a database of LIDAR-generated prior map information, generate a synthetic image and compare the synthetic image to the real-time visual camera data to determine corrected position data to determine a camera position based thereon, and apply corrected navigation information of the camera based on the determined camera position.

US 2003/0030398 A1 describes a method of utilizing a cleaning robot system, comprising commanding the robot system to perform a function in an area, accessing a stored 2D map of the area layout, the map having at least one function task associated with each area segment, localizing a first position of the robot system in the area based on a sensor system including laser, gyroscope, odometry and sonar sensors, determining a function path for the robot system, repeatedly continuously localizing a current position of the robot system while navigating the robot system along the function path using the sensor data and the stored map and completing the at least one function task that is associated with the current position of the robot system on the stored map of the area.

There remains a need for improved localization methods and systems for mobile remote inspection and/or manipulator tools.

SUMMARY

It is an object of the invention to provide a localization technique which allows to obtain the precise pose of a mobile remote inspection and/or manipulation tool in a three-dimensional confined space. In particular, it is an object of the invention to provide a localization method and system, which are able to precisely localize a mobile remote inspection and/or manipulation tool using simple and small sensors and can be integrated on different types of robots or manipulators, including magnetic crawler robots and cameras on poles. The localization method and system should allow to precisely localize the location of the origin of data acquired by cameras or sensors inside confined spaces and use the localized data for future missions for inspection and/or maintenance of the confined space if desired.

This objective is achieved using a localization method and system for mobile remote inspection and/or manipulation tools in confined spaces as claimed in independent claims 1 and 14. Especially preferred embodiments of the invention are subject-matter of the dependent claims.

A localization method for mobile remote inspection and/or manipulation tools in confined spaces, comprises placing a mobile remote inspection and/or manipulation device inside a confined space, wherein the device has a carrier movable within the confined space, such that it changes its position and orientation in a three-dimensional (3D) space, and an inspection and/or manipulation tool mounted on the carrier. The method includes arranging a number of pose sensors on the movable carrier for providing signals indicative of the position and orientation of the movable carrier and providing a number of distance sensors on the movable carrier. The method further includes accessing a pre-existing three-dimensional (3D) environment model of the confined space, wherein the environment model represents at least some of the interior surfaces of the confined space, and navigating the movable carrier with the inspection and/or manipulation tool inside the confined space.

The method further includes determining sensed pose (i.e. position and orientation) data indicative of the current position and orientation of the movable carrier within the confined space using signals received from the pose sensors, sensing the distance to interior surfaces of the confined space using the distance sensors on the movable carrier, and simulating distance measurements as they would result from a set of candidate poses of the movable carrier using the 3D environment model, wherein the set of candidate poses is generated based on the sensed pose data. The method further includes comparing the obtained distance simulation results to the actual distance measurements provided by the distance sensors, identifying the most likely pose of the movable carrier based on the comparison results, and determining the 3D pose of the movable carrier as the identified most likely pose.

Thus, the method of present invention includes a precise localization of the inspection and/or manipulation tool in confined 3D spaces, where signals from global localization systems, like GPS, or compass readings are not available. The method does not require any external references or beacons, but uses an existing 3D environment model or surface model as a "geometrical sensor" instead. The system does not require large or heavy on-board sensor systems, but may use small and simple time-of-flight (ToF) distance sensors, e.g. ToF infrared (IR) distance sensors, laser range finder devices or even a scanning sonar in the case of systems operating submerged in liquid instead. Unlike conventional visual odometry solutions, the method is independent of illumination or surface features. The global coordinate frame of the present invention is consistent for all missions and is inherently given by the use of the environment model.

In preferred embodiments of present invention, the pre-existing 3D environment model may consist of a set of connected triangles representing the interior surfaces of the confined space. The 3D environment model may be obtained from technical drawings of the confined space or through laser or light scanning of the confined space and subsequent conversion into the set of triangles, for example. A 3D environment model based on a set of connected triangles provides a good approximation of an exact model of even curved shapes of the interior surfaces of the confined space, while greatly reducing the computing effort associated with the steps of generating the set of candidate poses and simulating distance measurements from the set of candidate poses.

In preferred applications, the remote inspection and/or manipulation tool may be an inspection sensor or camera or an actuator mounted on a robot, a manipulator arm, a hand-held pole or other device configured to bring and/or move the inspection and/or manipulation tool inside the confined space. The tool may be preferably a movable and adjustable tool, like a pan-tilt-zoom (PTZ) camera which is capable of remote control of the pan, tilt angle, zoom level, focus level, illumination light intensity, etc. The tool may also be an actuator for performing manipulation or maintenance operations and the like.

In preferred embodiments of the invention, the mobile remote inspection and/or manipulation device may be a magnetic climbing robot, so-called crawler, which is configured to climb magnetic surfaces, e.g. metallic surfaces, in particular steel surfaces. The climbing robot may include a platform comprising magnetic wheels as the movable carrier, one or more drive motors to drive at least some of the wheels, and a video camera for capturing images of the interior surfaces of the confined space. Such remotely operated lightweight climbing robots are able to climb any vertical, inclined or curved frames or walls of vessels made of iron, steel or other magnetic metals. The camera may be able to deliver high quality visual inspection data online. The robot may be equipped with simple and small sensors for estimating the robot's pose.

In preferred embodiments, the magnetic climbing robot may include an inertial measurement unit (IMU) as at least part of the number of pose sensors. The IMU may be arranged to measure linear acceleration along three axes and also measure rotation speed around three axes and to provide signals indicative of the various linear accelerations and rotation speeds in 3D space. The sensed pose data of the movable carrier may then be determined using the measurement signals provided by the IMU. In addition, the IMU measurement data in combination with the pre-existing environment model may be used to appropriately simulate the distance measurements and estimate the pose of the wheeled platform of the crawler.

In addition, providing a number of distance sensors on the movable carrier may include providing a plurality of laser range finder devices, preferably LIDAR devices, ToF depth cameras or other similar range imaging or distance measuring sensors, e.g. structured-light 3D scanners, etc. Such distance sensors may be small and lightweight devices which provide distance measurements with sufficient high resolution.

In addition to the inertial measurement unit or as an alternative, the magnetic climbing robot may include rotary encoders mounted on shafts of the climbing robot and configured to measure and provide signals indicative of the angular position or motion of the wheels of the movable carrier, i.e. odometry data. The sensed pose data of the movable carrier may then be determined using the measurement signals or odometry data provided by the rotary encoders. From the measured angular position or motion values of the wheels, the position or traveled distance and any rotation around a vertical axis of the climbing robot, i.e. its orientation in 3D space, may easily be estimated. Such odometry sensors are also small and lightweight and appropriate for use in the disclosed method.

In especially preferred embodiments, the magnetic climbing robot includes both an inertial measurement unit (IU) and at least two rotary encoders assigned to different wheels of the movable carrier. The set of candidate poses may then be generated based on measured inertia signals received from the IU and measured odometry signals received from the rotary encoders. Fusing wheel odometry data with IMU information may improve estimates of the current position and orientation of the climbing robot. In addition, typical sensor noise of the IU and the rotary encoders may also be taken into account to additionally enhance accuracy of the pose estimation.

In other embodiments of the method, the mobile remote inspection and/or manipulation device may be a movable pole mounting an inspection camera, e.g. a PTZ camera. The movable pole may be a hand-held or clamped or clamp-guided pole which is inserted through an inspection opening. The movable pole may be extendable and retractable in its longitudinal direction and rotatable around its longitudinal axis. Position, tilt and rotary sensors may be arranged on the pole or the pole clamp to provide signals indicative of the linear and rotary position as well as of the insertion angle of the pole. In preferred embodiments, the pole may be a telescopic pole or a pole extendable by stacking pole segments together. The candidate poses may be generated based on the sensed pose data determined from the sensed linear and rotary position signals received from the sensors. The movable pole may additionally carry the distance sensors for the disclosed localization procedure. The movable tool may also be a robotic or manipulator arm.

In any embodiment of the method mentioned before, generating the set of candidate poses and identifying the most likely pose may include using probalistic sensor data fusion which is based on a Monte Carlo localization, particle filtering technique or a Kalman filter. Using the small and simple sensors of present invention, such a technique is capable of providing precise device pose estimates and localization data.

The Monte Carlo localization, particle filtering technique may include an initialization step in which the initial belief is set following a distribution of particles in the surroundings of the place where the mobile remote device was deployed. The technique may further include a prediction step in which the poses of the particles are updated based on the received sensed pose data, including both the IMU and odometry data for the climbing robot or odometry data only for the pole, and also considering typical sensor noise. The technique may further include an update step in which weights are assigned to each of the particles based on the simulated distance measurements and the actual distance measurements obtained from the distance sensors, wherein the particles which are likely to give the actual distance measurements receive a higher weight. The technique may further include a resampling step in which a new set of particles is obtained by resampling the particles according to their weights.

Any method mentioned before may further include, after the determination of the pose of the movable carrier, calculating the pose of the inspection and/or manipulation tool, in particular any camera(s) or sensor(s), e.g. a PTZ camera, ultrasound sensor, surface profiling sensor, etc., mounted on the movable carrier and localizing data recorded by the tool and/or using the determined pose data of the movable carrier or the calculated tool pose data for controlling the tool.

In case the inspection and/or manipulation tool includes a camera or sensor providing inspection data, the method may further comprise storing recorded inspection data together with the associated localization data. Images recorded by the camera can be directly associated with the position on the asset surface or thickness readings provided by ultrasound sensors can be stored in combination with their coordinates with respect to the asset. In addition or as an alternative, mission data including the device path (sequence of the device poses), information regarding the camera, sensor or manipulator state (for cameras the pan and tilt angles, zoom levels, focus levels, light intensities, etc.) and any annotations the operator generates during the mission may be stored together with the recorded inspection and localization data. In further addition or as a further alternative, a 3D visualization of the part of the environment of the mobile remote device, at which an inspection camera or other sensor is focused on, may be displayed to the operator together with inspection and/or manipulation data, if desired. The operator may thus directly see the monitored or manipulated portion of the interior wall of the confined space, e.g. the images which the camera is currently capturing. This may help the operator to avoid mistakes and reduce the inspection time.

The invention thus provides a localization method for mobile remote inspection and/or manipulation tools in confined spaces, such as in pressure vessels, storage tanks, boilers, etc., which makes use of sensor fusion in order to precisely determine the pose of a sensor, camera, or manipulator carrier, such as a robot, pole, robotic arm, and others, inside the confined space. The method is able to obtain the precise pose of the tool with respect to global geographical coordinates or a fixed reference frame using simple and small sensors which can be integrated on different types of inspection or manipulation devices. The method is generic and allows for use of different inspection and/or manipulation tools to feed the same asset data model with precisely localized data. The method may be used to localize, report and store the location of the origin of data acquired by cameras or sensors mounted on a robot or a pole inside confined spaces and to store, report and visualize the inspection data with respect to the asset coordinates, irrespective of the robot, manipulator or other tool used to collect the data. The method may greatly assist an operator with moving the robot or other tool inside confined spaces by presenting the robot or tool and the camera's or sensor's field of view in a three-dimensional view. This may be used for automatically or semi-automatically guide a robot or actuated tool inside a confined space along a specific path or trajectory. For example, a camera could be guided to follow a weld seam or to take pictures of a specific location or a sequence of locations. The method may be used to automatically move a robot along a path recorded during previous missions. The method may also be used to visualize the data to the operator in a three-dimensional view in the form of markers or data visualizations like textures attached to the asset visualization. The method may be used to visualize to the operator potential areas reachable by a given manipulator and sensor combination from the current location. This could be areas which an actuated camera can photograph at certain quality. The method may be used to plan a feasible or optimal path for robotic or other inspection systems inside confined spaces. The method may further be used to follow pre-planned or stored paths automatically or semi-automatically.

According to another aspect of the invention, a localization system for mobile remote inspection and/or manipulation tools in confined spaces, in particular in pressure vessels, storage tanks, boilers, etc., used for instance for power generation, is provided. The system comprises a mobile remote inspection and/or manipulation device including a carrier movable within the confined space and an inspection and/or manipulation tool, a number of pose sensors arranged on the movable carrier for providing signals indicative of the position and orientation of the movable carrier, and a number of distance sensors arranged on the movable carrier for providing signals indicative of the distance to interior surfaces of the confined space. The system further comprises a control device including processor means and a memory. The memory stores a pre-existing three-dimensional (3D) environment model of the confined space and a program code which, when loaded into and executed by the processor means, causes the processor means to perform the method of any embodiment described above.

In preferred embodiments of the localization system, the inspection and/or manipulation tool is an inspection sensor or camera or an actuator mounted on a robot, preferably a magnetic climbing robot, a manipulator arm, a hand-held pole or other device configured to bring and/or move the inspection and/or manipulation tool inside the confined space.

The localization system of present invention also makes use of sensor fusion in order to precisely determine the pose of the sensor, camera or manipulation tool on the movable carrier, e.g. a robot, pole, robotic arm, etc., inside the confined space. The system makes use of a pre-existing environment model in order to obtain precise actuator pose estimations 3D space using simple and small sensors only, which can be integrated on different types of manipulators, including magnetic crawler robots and poles. The system makes use of sensor fusion in order to precisely determine the pose of the sensor, camera and manipulator carrier inside the confined space. The system may be used to localize, store and report different types of inspection data collected through various means of remote tools. The system allows for use of different inspection tools to feed the same asset data model with precisely localized data.

Any of the above-mentioned embodiments of the localization method of present invention also apply to the localization system of present invention and the advantages achieved by the various embodiments of the localization method are also achieved by the localization method.

BRIEF DESCRIPTION OF THE DRAWINGS

Further details of advantageous embodiments of the present invention may be taken from the dependent claims, the drawing and the associated description. The invention is described below in greater detail by reference to the drawing which shows exemplary embodiments of the invention that are not limiting in any way. The same reference numbers are used in all figures to designate the same elements. In the drawing:

DETAILED DESCRIPTION

Figure 1:
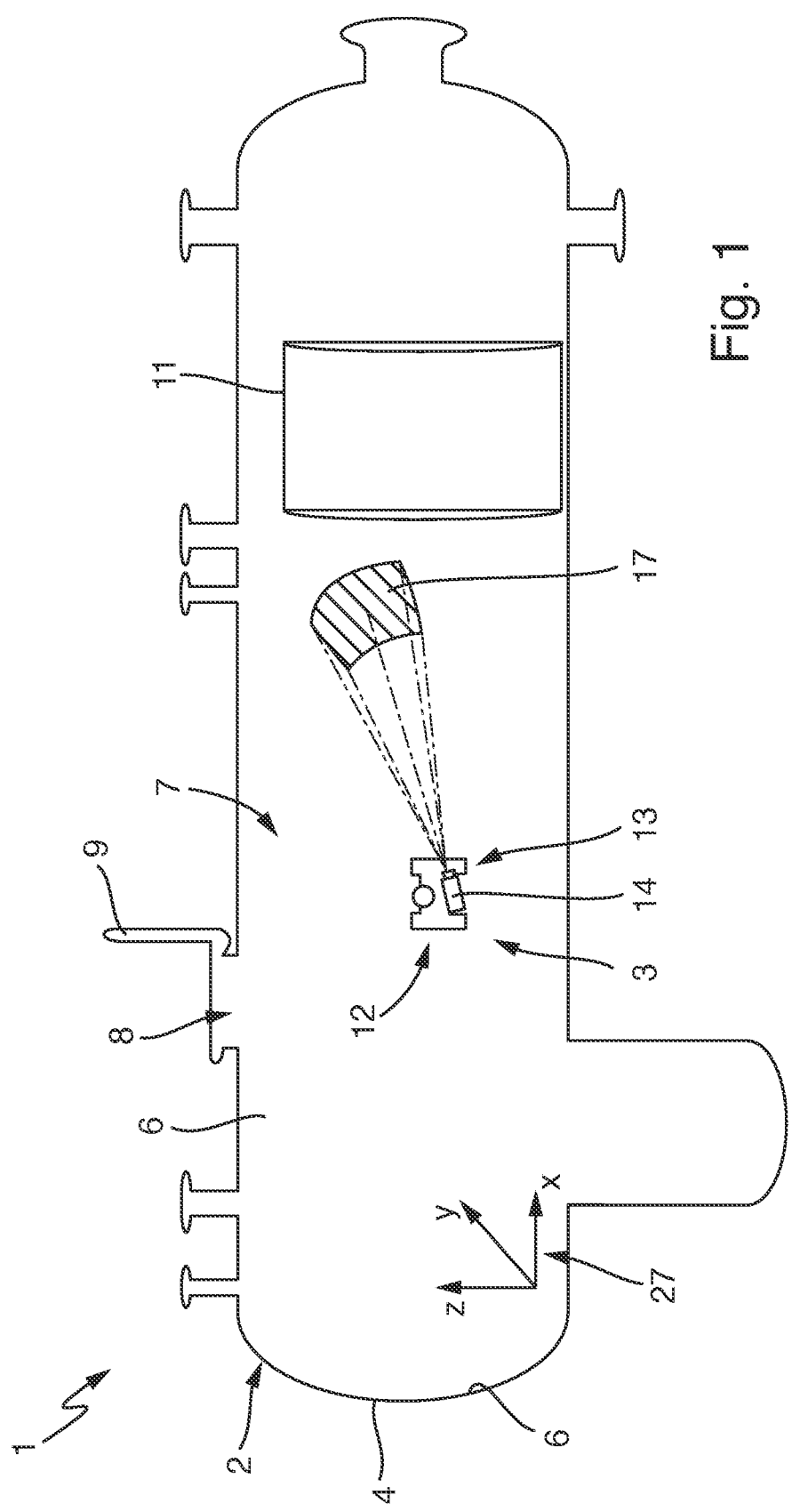
FIG. 1 is a schematic cross-sectional view of a pressure vessel with a magnetic climbing robot for remote inspection and/or manipulation in the interior space of the pressure vessel to illustrate an example of an environment in which the system of present invention may be practiced.

FIG. 1 shows a system 1 including a pressure vessel 2 and a mobile remote inspection and/or manipulation device 3 to illustrate an exemplary environment in which present invention may be practiced. The cross-sectional view of FIG. 1 is greatly simplified for clarity and convenience. The pressure vessel 2 comprises one or more walls 4 which have interior surfaces 6 delimiting an interior space 7, which is a confined space in which the mobile remote inspection and/or manipulation device 3 may be utilized. It should be understood that the pressure vessel 2 is just an example for a vessel, tank, boiler or other container which has a confined space. A confined space is herein a space which has limited or restricted means of entry or exit. It may be large enough for a person to enter to perform tasks, but is not designed or configured, nor suitable for continuous occupancy by human beings. The confined space may be the interior space of a boiler, a fluid storage tank, a septic tank containing sewage, an underground electrical vault, a ship compartment or other similar space. In a pressure vessel, the interior normally includes gases or fluids under pressure which is above the ambient pressure.

In the exemplary embodiment shown, the entire wall 4 of the pressure vessel 2 has an elongated and substantially circular cylindrical shape. The pressure vessel 2 is disposed horizontally with its longitudinal direction on a floor which is omitted in FIG. 1 for simplicity. The interior surface 6 of the wall 4 is, thus, substantially concave, but may have any suitable contour. The one or more walls 4 may be straight or curved, may run vertically or be inclined. The walls 4 may include internal structural features, like braces, flanges or weld seams connecting subsequent wall portions together. There may also be some internal structures, like a filter and the like, such indicated by 11, disposed within the interior space 7 of the pressure vessel 2.

The pressure vessel 2 has an access opening 8 positioned at the top of the wall 4, which may be used to introduce inspection and/or manipulation equipment into the confined interior space 7 from above. A closure flap 9 is arranged to close and open the closure flap 9 to enable or prevent access to the interior space 7.

The mobile remote inspection and/or manipulation device 3 (subsequently also briefly called mobile remote device 3) is disposed inside the confined space 7 of the pressure vessel 2. In the example shown in FIG. 1, the mobile remote device 3 is a wheeled magnetic climbing robot 12 which is configured to climb the interior surfaces 6 of the wall 4 of the pressure vessel 2 and is able to reach substantially all portions of the interior surface 6. To this end, the magnetic climbing robot 12 may have magnetic wheels which allow the magnetic climbing robot to adhere to the interior surface 6 while moving along the interior surface 6 in any direction if the interior surface 6 or the whole wall 4 is made of a magnetic material, in particular steel, iron or other metallic magnetic material. Such a magnetic climbing robot 12 is sometimes referred to as a crawler. Instead of wheels, the climbing robot 12 might have motorized tracks, chains or other driven means which allow the climbing robot to climb the interior surfaces 6 of the wall 4.

While a magnetic climbing robot 12 is shown in FIG. 1 and described in the following as an exemplary and preferred mobile remote inspection and/or manipulation device 3, a robot, a manipulator arm, a pole or any other device configured to bring an inspection and/or manipulation tool inside the confined space 7 and move the tool therein might be used instead of the climbing robot 12. Therefore, the following description with respect to the climbing robot 12 also applies to other mobile remotely operating and/or remotely operated inspection and/or manipulation devices 3.

The climbing robot 12 comprises an inspection and/or manipulation tool 13. In some embodiments, the tool 13 may be used to inspect and monitor the interior surfaces 6 of the walls 4 for defects, like cracks, corrosion, and the like. In the example shown in FIG. 1, the tool is an inspection tool, in particular an inspection camera 14 which is arranged to project an illumination light and capture images of a field of view 17 on the interior surface 6 at which the inspection camera 14 is focused on. Instead of the inspection camera 14, any other inspection sensor or a plurality of sensors, like ultrasound sensors, surface profiling sensors, infrared (IR) sensors, etc., may be used. Apart from inspection tools, manipulator tools may also be used to perform maintenance or repair tasks on the interior surfaces 6.

Figure 2:
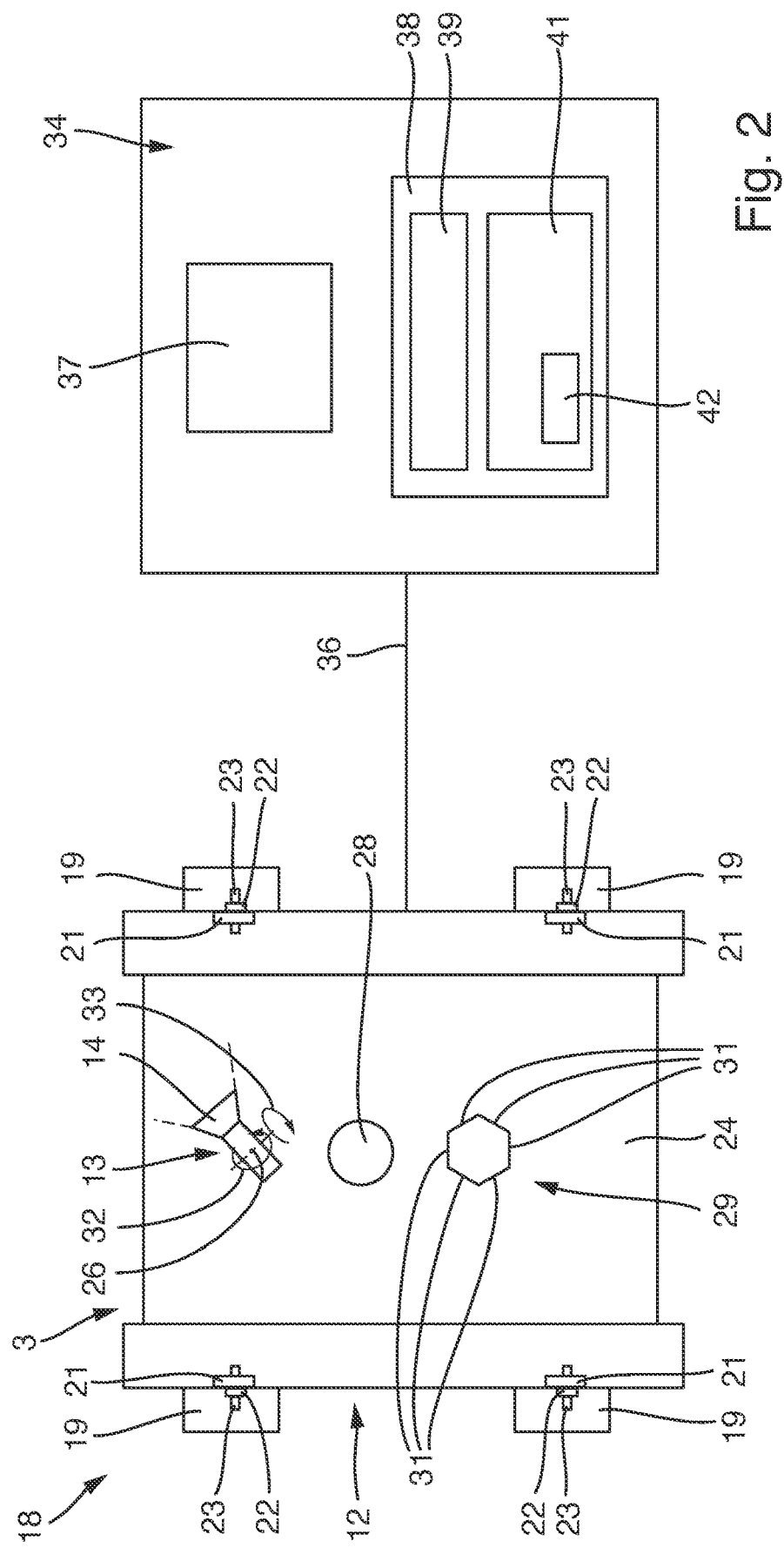
FIG. 2 is simplified block diagram of a system including a mobile remote inspection and/or manipulation device, like the magnetic climbing robot of FIG. 1, and further including processing means for localization of data acquired by the mobile remote inspection and/or manipulation device.

FIG. 2 shows a simplified block diagram view of a remote inspection and/or manipulation system 18 which can be used to inspect and/or manipulate the interior surfaces 6 of the pressure vessel 2 or any other vessel, tank, boiler, etc. The system 18 may be used in any confined space environments which may be dangerous or unhealthy places presenting risks for human beings, include increased pressures or biological hazards from the potential contact with the content of the vessel, or present other risks. The remote inspection and/or manipulation system 18 may be utilized for remote inspection and/or remote maintenance obviating the need to employ maintenance personnel for these tasks. Such confined spaces, like the interior of pressure vessels, combustion chambers of power plant boilers, etc., are generally GPS-denied environments, where GPS or other global positioning systems signals cannot be received, and may have very poor lighting conditions, iron dust and repetitive patterns on the structure walls and present other challenges that may be overcome by the system 18. The system 18 is able to localize, store and report different type of inspection data or perform manipulation tasks in different places on the interior surfaces 6 at precisely localized positions.

With continuing reference to FIG. 2, the remote inspection and/or manipulation system 18 comprises the mobile remote inspection and/or manipulation device 3, which may be the magnetic climbing robot 12 of FIG. 1, which carries an inspection camera 14 as an exemplary inspection and/or manipulation tool 13. The magnetic climbing robot 12 has a number of motorized wheels 19 which are made of a magnetic material such that the climbing robot 12 is able to reliably adhere to the inner surfaces 6 of the walls 4 of the pressure vessel 2 while moving therealong. In present case, the climbing robot 12 has 4 motorized magnetic wheels 19, but may have any number of 6 or more wheels 19. Each motor driven wheel 19 is assigned a traction motor 23, which may be an electric motor arranged to drive the corresponding wheel 19. In some embodiments, not all driven wheels are directly coupled to a motor. Belts, chains or other means of force transmission may be used to drive several wheels form a single motor. All wheels 19 need not be motor driven, but it may be advantageous to provide an all-wheel drive to increase drivability and maneuverability.

The climbing robot 12 may preferably include rotary encoders 22 mounted on wheel shafts 23 which support the wheels 19 and are mounted on a platform 24 of the climbing robot 12. The platform 24 may be considered as the movable carrier of the climbing robot 12. Preferably, at least each driven wheel 19 is assigned an individual rotary encoder 22. It may be advantageous to also equip non-driven wheels 19 with an own rotary encoder 22 to enhance the determination of the poses, i.e. position and orientation, of the climbing robot 12 inside the confined space 7 using the measurement signals provided by the rotary encoders 22. From the measured angle position or motion values of the wheels 19, the position or traveled distance of each wheel 19 and also any rotation about a vertical axis 26 of the climbing robot 12 may be estimated as is generally known in the art. The rotary encoders 22 on the wheels 19 are also called odometry sensors.

Figure 4:
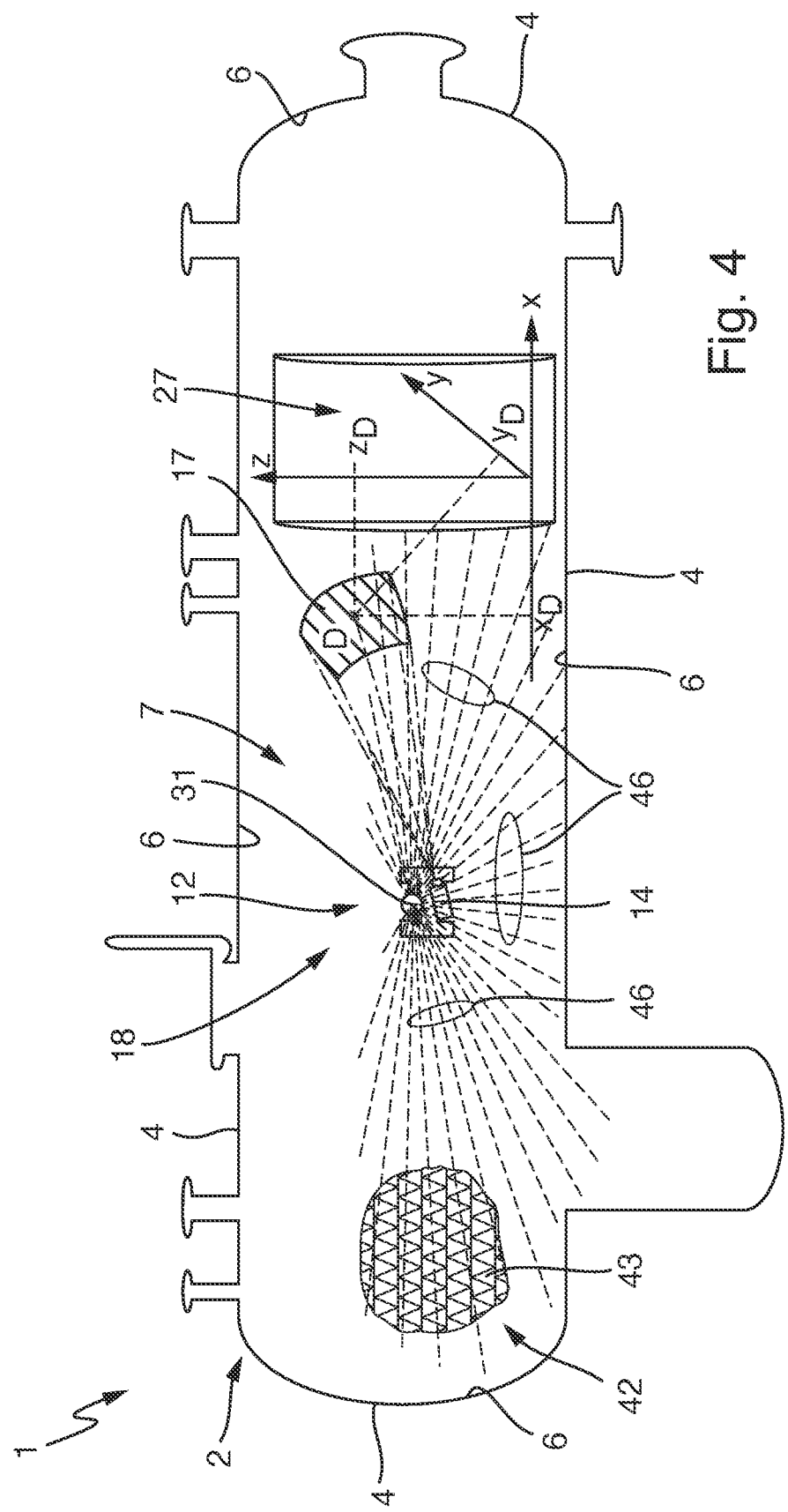
FIG. 4 is a simplified cross-sectional view of the pressure vessel including the magnetic climbing robot therein, as shown in FIG. 1, illustrated during operation in a mission.

In addition to the rotary encoders 22, the climbing robot 12 may preferably include additional sensors which facilitate determining the precise location of the climbing robot 12 inside the confined space 7 with respect to a global reference frame, such as the exemplary Cartesian coordinate system 27 indicated in FIG. 4 and defined by three orthogonal axes x, y, and z. These sensors may include pose sensors which are additionally used to determine the pose of the climbing robot 12 with respect to the global reference frame 27 and may preferably include an inertial measurement unit (IU) 28. As is generally known, an inertial measurement unit is an electronic device that measures and provides signals indicative of the angular rate and orientation of a body using a combination of accelerometers, gyroscopes and sometimes magnetometers. In any case, the IMU 28 used by the climbing robot 12 is arranged to measure the linear acceleration along the three axes x, y, z and also measure rotation speed around the three axes x, y, z and provide signals indicative of the measured linear acceleration and rotation speed values. The measurement signals or data provided by the IMU 28 may be fused together with the measurements provided by the rotary encoders 22 to more precisely estimate the location of the movable platform 24 and the climbing robot 12.

The climbing robot 12 may additionally include a number of distance sensors disposed on the platform 24. In present case, the climbing robot 12 includes a laser range finder unit 29 which is fixed on top of the platform 24 and includes a plurality of laser range finder devices 31 which are arranged to emit laser light in different directions and to receive laser light reflected from opposed structures, such as from the opposed interior surfaces 6 of the walls 4 of the pressure vessel 2. Differences in laser return times and wavelength can then be used to make digital three-dimensional (3D) representations of the target, e.g. the interior surfaces 6 of the wall 4. The laser range finder devices 31 are sometimes called LIDAR (light imaging, detection and ranging) devices. While the LIDAR devices 31 are preferred for their good measuring quality compared to low complexity and costs, other distance sensors, like time-of-flight (ToF) cameras, structured-light 3D scanners or other similar range imaging or distance measuring sensors, might also be used. Furthermore, while the laser range finder unit 29 comprising six laser range finder or LIDAR devices 31 is shown in FIG. 2 as an example, any number of at least one, preferably at least two or more laser range finder devices or distance sensors may be used.

In addition, the climbing robot 12 comprises the inspection camera 14, which is a video camera configured for capturing images of the interior surfaces 6 of the confined space 7 with high fidelity and quality. Preferably, the camera is a PTZ (pan-tilt-zoom) camera, which can adjust its pan angle (as is indicated by the circular arrow 32 around the vertical axis 26) and its tilt angle (as is indicated by the circular arrow 33 around an axis perpendicular to the vertical axis 26) and may also adjust other parameters, like its zoom level, focus level, illumination light intensity, etc.

While an inspection camera 14, especially a PTZ camera 14, is shown as the preferred inspection tool for capturing images of the interior surface 6, another inspection sensors or actuators for performing manipulation and maintenance operations may also be used.

The remote inspection and/or manipulation system 18 further includes a control device 34 arranged to monitor motion of the mobile remote device 3, e.g. the climbing robot 12, and control its navigation through the confined space 6. The control device 34 is communicatively coupled to the mobile remote device 3, e.g. the climbing robot 12, through a communication link 36 which may be a wired or a wireless communication link based on any wireless communication technology, such as Ethernet, Bluetooth, WiFi, etc. The control device 34 is shown in FIG. 2 as a separate block from the mobile remote inspection and/or manipulation device 3, e.g. the magnetic climbing robot 12, but may also be implemented at least in part within the mobile remote device 3.

The control device 34 includes processor means 37 and a memory 38. (Other required components of the control device 34, including interface means for communication over the communication link 36, are omitted in FIG. 2 for clarity and convenience.) The processor means 37 may be any processor, microprocessor, microcontroller or similar computing device which is arranged to load and run a program, in particular a software or firmware program, to control and monitor movement of the mobile remote device 3. In preferred embodiments, in which the control device 34 is a personal computer, laptop, tablet, smartphone or similar computing device, the processing means may be a CPU of the computing device. The control device 34 might in principle be implemented at least in part based on logic gate devices or a programmable logic device.

The memory 38 is any memory or storage arranged to store program and data and may be, among others, a RAM, ROM, PROM, EPROM, EEPROM and combinations thereof. The memory 38 may include a program memory portion 39 storing the software or firmware program for the processor means 37 to operate the mobile remote device 3, and a data memory portion 41. The data memory portion 41 stores parameters and other data required by the processor means 37 to operate the mobile remote device 3 and may also store data acquired during navigation of the device 3, such as sensor data provided by the odometry sensors 22, the IMU 28, the LIDAR devices 31 and the captured image data provided by the inspection camera 14 via the communication link 36.

The memory 38 also stores in the data memory portion 41 a pre-existing three-dimensional (3D) environment model 42 of the confined space 7. The 3D environment model 42 represents at least some, preferably all of the interior surfaces 6 which bound the confined space 7. The 3D environment model 42 may be obtained by converting technical drawings of the confined space 7, which may be available from the proprietor or operator of the vessel or plant, into an appropriate surface model. An appropriate surface model may include sets of triangles representing the respective interior surfaces 6 of the vessel 2.

Alternatively, the confined space 7 may be scanned using a laser or other light scanning device and the scan data converted into the sets of triangles. A 3D environment model 42 including such a set of triangles 43 is indicated in a portion of the wall 4 in FIG. 4.

A 3D environment model based on a set of connected triangles provides a good approximation of an exact model of the interior surfaces of the confined space, while reducing computing efforts associated with calculating the pose of the mobile remote device 3 with respect to the wall 4. Naturally, other 3D environment models of the interior surfaces 6, which may provide a more precise representation of their shapes, may be used.

Besides the visual inspection data provided by the inspection camera 14 of the mobile remote device 3, e.g. the climbing robot 12, it is also necessary to know the accurate position of where the data was acquired. However, self-localization using the on-board sensors provided on a mobile remote device 3 may not be accurate enough. For example, the movement of the climbing robot 12 may be hampered by some structural features and complex geometries in or on the interior surfaces 6 of the walls 4, like beams, bolts, welds, pipes, etc., which may cause the magnetic climbing robot 12 to lose grip and sheer off. This may result in a distortion of the measurement signals indicative of the movement of the robot, which are provided by the on-board position or motion sensors. In addition, typical noise of such sensors results in additional sensor errors. Thus, the reliability of the pose estimates obtained by using the on-board sensors increasingly reduces during a mission of the mobile remote device 3 due to the accumulation of the measurement signals distortions and noise over the course of the mission.

The remote inspection and/or manipulation system 18 of present invention implements a unified method to localize, store and report different type of inspection data collected through the inspection camera 14 or another inspection sensors. The localization method of present invention makes use of sensor fusion in order to precisely determine the pose of e.g. the climbing robot 12 and the inspection camera 14 inside the confined space 7. The localization method 44 of present invention is explained in more detail in connection with the flow chart shown in FIG. 3.

Figure 3:
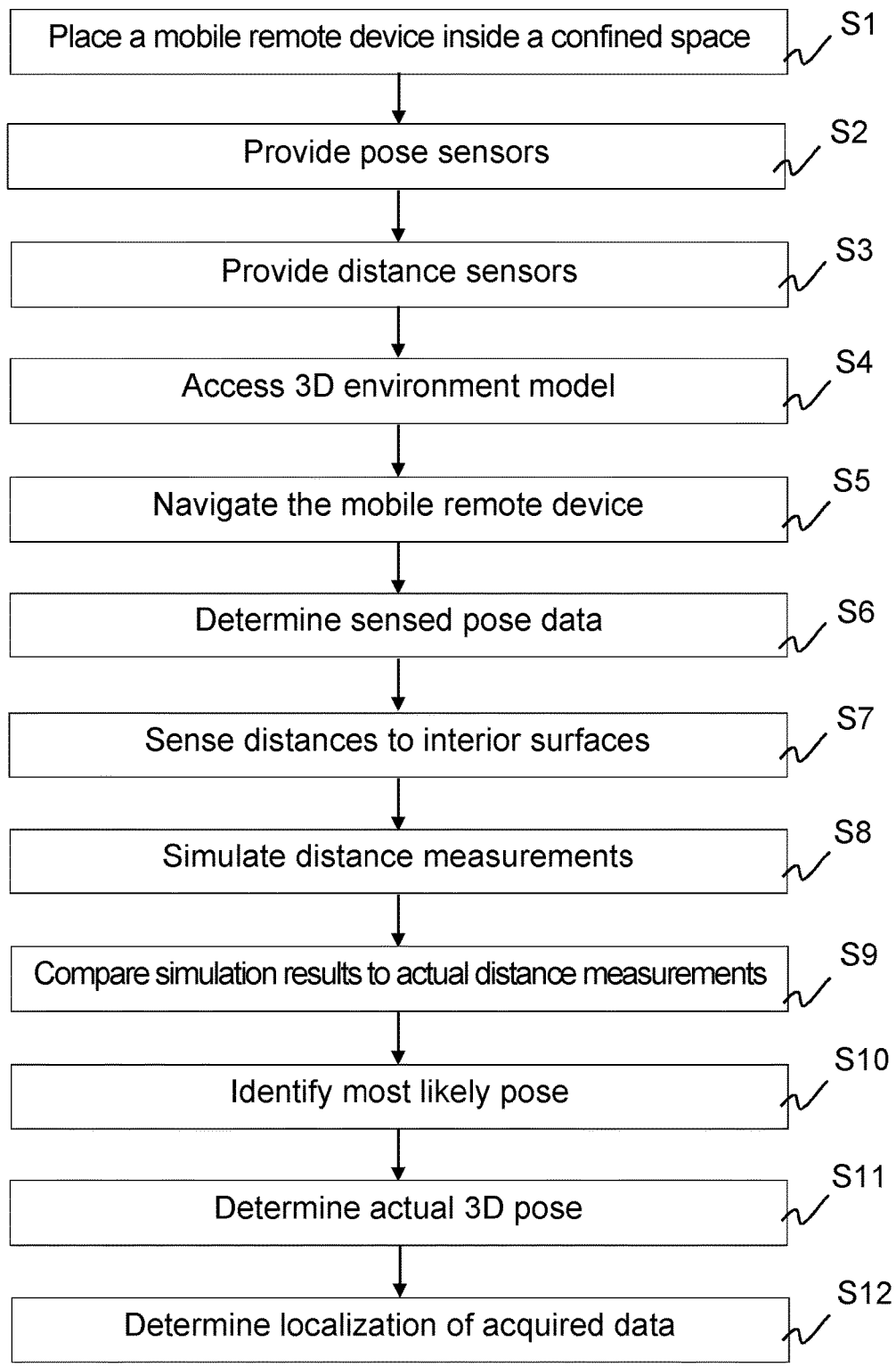
FIG. 3 is a flow chart of a localization method for mobile remote inspection and/or manipulation tools, which can be implemented in the system of FIG. 2, in a simplified version.

Referring to FIG. 3, the localization method 44 for mobile remote inspection and/or manipulation tools in confined spaces starts with the step S1, in which the mobile remote inspection and/or manipulation device 3, such as the climbing robot 12 of FIGS. 1 and 2, is placed inside a confined space, such as the interior space 7 within the pressure vessel 2, through the access opening 8 or the access door 11, for example. The mobile remote device 3 has a carrier, e.g. the platform 24, which is movable within the confined space 7 by driving the wheels 19, for example. The remote inspection and/or manipulation device 3 further includes an inspection and/or manipulation tool, which may be the inspection camera 14 for capturing images of the interior surfaces 6, an ultrasound sensor for measuring the thickness of the wall 4, a surface profiling sensor, any other suitable inspection sensor or an actuator.

In step S2, a number of pose sensors are arranged on the movable carrier for providing signals indicative of the position and orientation of the movable carrier. For example, the IMU 28 and the rotary encoders 22 may be arranged on the platform 24 to measure and provide signals indicative of the linear acceleration along the three axes x, y, z and rotation speed around the three axes x, y, z and to measure and transmit signals indicative of the angular position or motion of the wheels 19 of the climbing robot 12 to the control device 34, for example.

In a step S3, a number of distance sensors may be provided on the movable carrier. For example, the laser range finder unit 29 including the laser range finder or LIDAR devices 31 may be provided. Alternatively, one or more time-of-flight cameras or similar range imaging or distance measuring sensors or even contact sensors may be used.

In a step S4, the method may include accessing a pre-existing three-dimensional (3D) environment model of the confined space, which represents at least some of the interior surfaces of the confined space. For example, processor means 37 of the control device 34 may access the pre-existing 3D environment model 42 which includes one or more sets of triangles 43 representing the interior surface(s) 6 of the wall(s) 4 and is stored in the memory 38.

In step S5, the method may include navigating the mobile remote device, e.g. navigating the climbing robot 12, with the inspection and/or manipulation tool 13, e.g. the inspection camera 14, thereon inside the confined space.

In step S6, sensed pose data indicative of the current position and orientation of the movable carrier, e.g. the platform 24 of the climbing robot 12, within the confined space may be determined using signals received from the pose sensors, in particular the inertial measurement unit 28 and the rotary encoders 22. The pose data may be estimated using sensor data fusion in order to precisely determine the sensed pose of the platform 24 and climbing robot 12.

In step S7, the distance to interior surfaces of the confined space may be sensed using the distance sensors on the movable carrier. In particular, the distances to different portions of the interior surfaces 6 of the walls 4 may be sensed using the laser range finder or LIDAR devices 31 provided on the climbing robot 12.

In step S8, distance measurements are simulated as they would result from a set of candidate poses of the movable carrier using the 3D environment model. The set of candidate poses may be generated based on the sensed pose data, i.e. the data obtained from the signals provided by the rotary encoders 22 and the IMU 28. Then, the distances from the set of candidate poses to respective portions of the interior surfaces 6 are simulated.

In step S9, the obtained distance simulation results may be compared to the actual distance measurements provided by the distance sensors. In particular, the results of the simulations obtained based on the sensed pose data from the rotary encoders 22 and the IMU 28 are compared to the actual distance measurements provided by the LIDAR devices 31.

In step S10, the most likely pose of the movable carrier may be identified based on the comparison results. In particular, the most likely pose of the platform 24 or climbing robot 12 may be identified based on the comparison results as that candidate pose which provides simulated distances which best fit the actual measured distances.

In step S11, the actual 3D pose of the movable carrier may be determined as the identified most likely pose. In particular, the 3D pose of the platform 24 or climbing robot 12 may thus be determined as the most likely pose identified in step S10.

In step S12, the localization of the acquired data is determined based on the actual 3D pose of the movable carrier determined in step S11 and the actual state of the inspection and/or manipulation tool. The data localization may include determination of the exact positions of the image data captured by the inspection camera 14 based on the determined actual 3D pose of the platform 24 and the relative position and orientation, the adjusted zoom factor, focus level, illumination level, etc., of the camera 14.

Thus, the localization method 24 of present invention allows to precisely localize the inspection data by making use of the pre-existing 3D environment model 42 to obtain the precise pose of the mobile remote inspection and/or manipulation device 3 using small, simple and cost-effective sensors which can be integrated on the magnetic crawler robot or other inspection devices or on different types of manipulators, such as cameras on poles, sensors mounted on hand-held poles or actuated robotic arms. The localization method 44 is generic and allows for use of different inspection tools to feed the same asset data model with precisely localized data.

FIG. 4 shows the pressure vessel 2 of FIG. 1 including the magnetic climbing robot 12 during operation. As can be seen from FIG. 4, the magnetic climbing robot 12 moves along the wall 4 during its mission while its pose is being measured using the on-board pose sensors including the rotary encoders 22 and the IMU 28. In addition, the distances to adjacent or opposed surface areas of the interior surfaces 6 are measured using the LIDAR devices 31 or other distance measuring sensors. This is indicated by the plurality of light or laser beams 46 indicated in FIG. 4. As may be seen, a great area may be scanned by applying a multiplicity of such distance sensors.

FIG. 4 also indicates the 3D environment model 42 of the confined space 7 which is stored in the memory 38 and used in the localization method of present invention to determine the accurate pose of the climbing robot 12 inside the confined space relative to the global reference frame 27.

Once the climbing robot pose is known, the control device 34 is able to calculate the pose of the inspection camera 14 or any other sensor, such as an ultrasound sensor for measuring the thickness of the wall 4, a surface profiling sensor, etc., mounted on the climbing robot 12. This further allows for precise localization of any data recorded by the sensors, such as the image data recorded by the camera 14. The images recorded by the camera 14 can directly be associated with the position on the asset surface, e.g. the interior surfaces 6, or may directly be associated with other readings, such as thickness readings, provided by ultrasound sensors. The inspection data can then be stored in combination with their global coordinates with respect to the asset.

In FIG. 4, the field of view 17 of the inspection camera 14 is shown, which represents the image data captured by the camera 14. Using the localization method 44 of FIG. 3 and the known camera state, i.e. the pan and tilt angles, zoom level, focus level and the light intensity, as adjusted and instructed by the control device 34, the exact position of any data recorded by the camera 14 may be precisely localized. FIG. 4 shows as an example a data point D of the center of the field of view 17 of the camera 14 with the corresponding determined coordinates $x_D$, $y_D$, $z_D$ in the global reference frame 27 of the system 18.

The localization method 44 of present invention is a probabilistic sensor data fusion method which is based on a procedure known as the "Monte Carlo localization" or "particle filtering". Its use for 3D surface adhering magnetic climbing robots in combination with the laser range finder (LIDAR) sensors 31, the IMU 28 and the pre-stored 3D surface model 42 acting as a "geometrical sensor" provides considerable benefits of improved localization accuracy and direct user feedback based on simple and cost-efficient equipment and an easy to interpret model.

Figure 5:
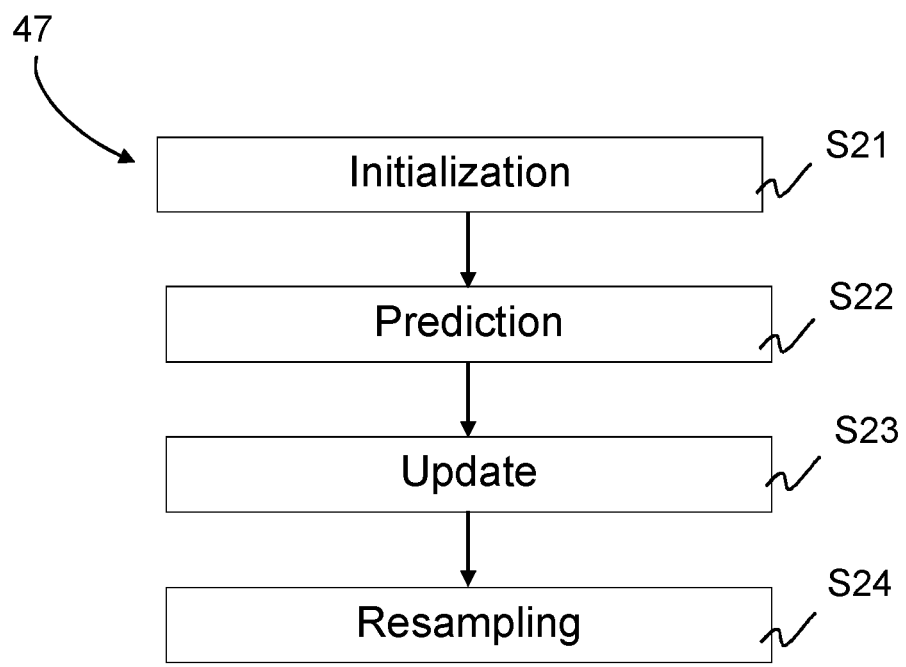
FIG. 5 is a simplified flow chart of a Monte Carlo localization or particle filtering procedure used in the localization method of FIG. 3.

The Monte Carlo localization or particle filtering procedure 47 is shown in more detail in FIG. 5. Referring to FIG. 5, the procedure 47 may include an initialization step S21, in which the initial belief is set following a normal distribution of particles in the surroundings of the place where the mobile remote device was deployed. For example, this may be the place where the magnetic climbing robot 12 was deployed in the confined space 7.

The procedure 47 may further include a prediction step S22 in which the poses of the particles are updated based on the received sensed pose data. For example, both the odometry data provided by the rotary encoders 22 and the acceleration and rotation speed signals provided by the IMU 28 may be advantageously fused and used. In addition, typical sensor noise of the IMU and the rotary encoders 22 may also be taken into consideration in the prediction step S22.

The procedure 47 may further include an update step S23 in which weights are assigned to each of the particles based on the simulated distance measurements from step S8 of the localization method 44 of FIG. 3 and the actual distance measurements obtained from the distance sensors, as sensed in step S7 of the localization method 44. The particles which are likely to give the actual distance measurements receive a higher weight than those particles which are less likely.

The procedure may further include a resampling step S24 in which a new set of particles is obtained by resampling the particles according to their weights. In other words, the old set of particles is randomly sampled with a sampling distribution proportional to the weights of the particles to obtain the new set of particles.

The prediction, update and resampling steps S22, S23, and S24 may be repeated several times to have the particles converge to the actual position of the climbing robot 12 and reduce the number of candidate robot poses such that the most likely pose may be finally identified in step S10 of the localization method 44 of FIG. 3. The Monte Carlo localization or particle filtering procedure 47 is robust, effective and reliable in precisely localizing the actual pose of the climbing robot 12.

Figure 6:
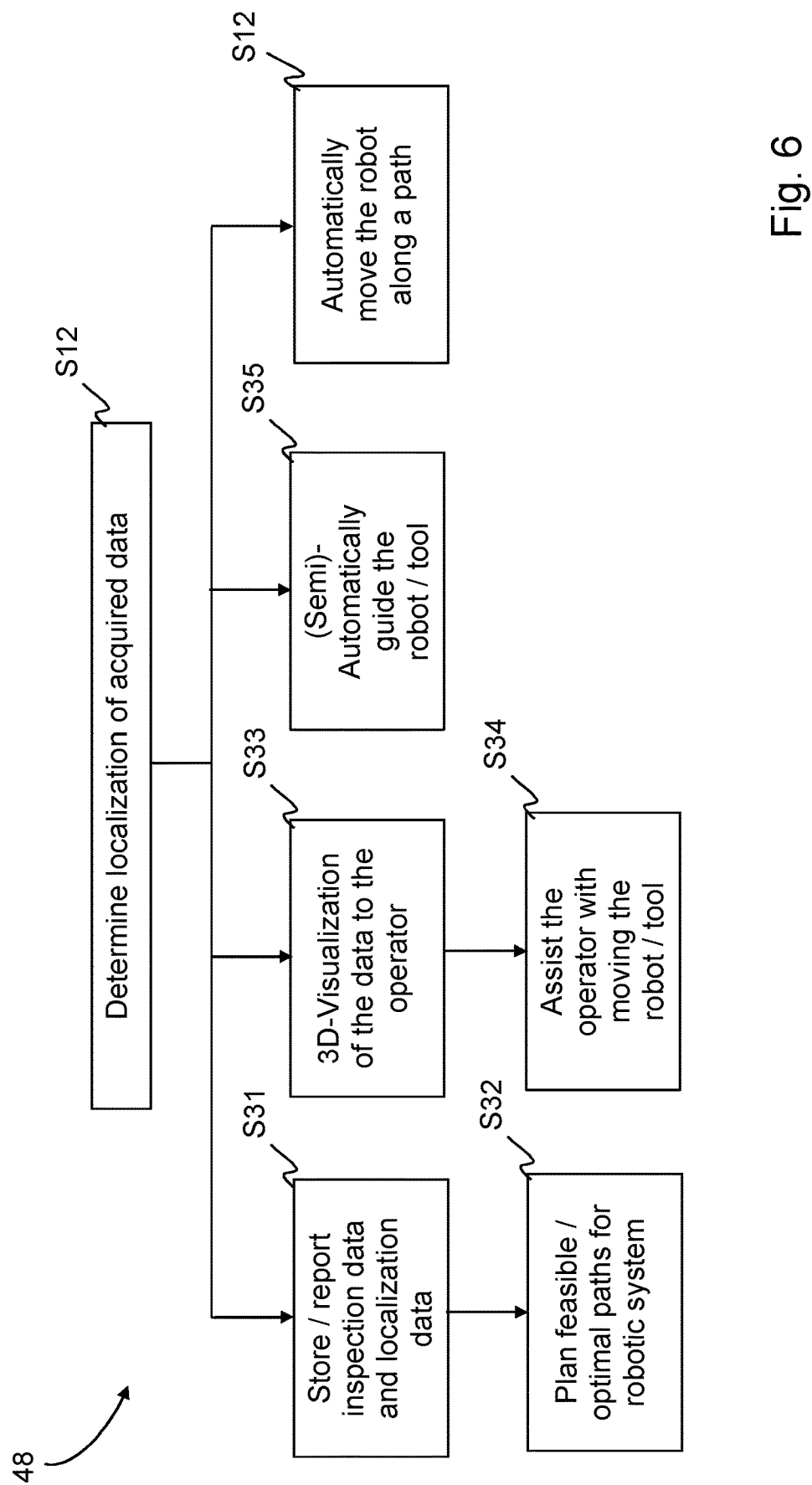
FIG. 6 is a simplified flow-chart of a continuing process of the localization method shown in FIG. 3, illustrating different uses of the localization data acquired in the method of FIG. 3.

FIG. 6 shows a continuation of the localization method 44 shown in FIG. 3. Referring to FIG. 6, and starting with the data localization step S12 also shown in FIG. 3, the continuation method 48 may include a step S31 in which the inspection data obtained from the inspection camera 14 or any other inspection sensor or a manipulator sensor provided on a manipulation system may be stored together with the localization data indicating the exact location of the origin of the acquired data inside the confined space 7 in a memory or storage, e.g. in the memory 38. The inspection data together with the localization data may also be reported to an operator if desired. The localization method 44 of present invention allows unified storing and reporting of inspection data with respect to the global asset coordinates, irrespective of the robot or tool used to collect the data.

The stored inspection data including the localization data may be used in step S32 to plan feasible or optimal paths for robotic or other inspection systems inside confined spaces, e.g. inside the confined space 7 within the pressure vessel 2.

In step S33, the continuation method 48 may include 3D visualization of the data to the operator on a monitor or other display device. This may include showing to the operator the sensor's field of view in a three-dimensional view and visualizing the data in the form of markers or data visualizations, like textures, attached to the asset visualization, for example. Optionally, potential areas reachable by a given manipulator and sensor combination from the current location may be visualized to the operator as well. This could be the areas which an actuated camera can reach and photograph at certain minimum quality.

In step S34, the method 44 may be used to assist an operator with moving the robot or other tool inside the confined spaces, e.g. the confined space 7, by presenting the robot or tool and sensor's field of view in the 3D visualization view.

In step S35, the method 44 may be used to automatically or semi-automatically guide a robot, such as the climbing robot 12, or any other actuated tool inside a confined space along a specific path or trajectory. For example, a camera can be guided to follow a weld seam or to take pictures of a specific location or a sequence of locations.

In step S36, the method 44 may be used to automatically move a robot along a path recorded during previous missions and/or to follow pre-planned or stored paths automatically or semi-automatically.

The steps S31-S36 of the continuation method 48 shown in FIG. 6 may be used alone or in any combination, even if there is no direct link between the respective blocks in FIG. 6.

Figure 7:
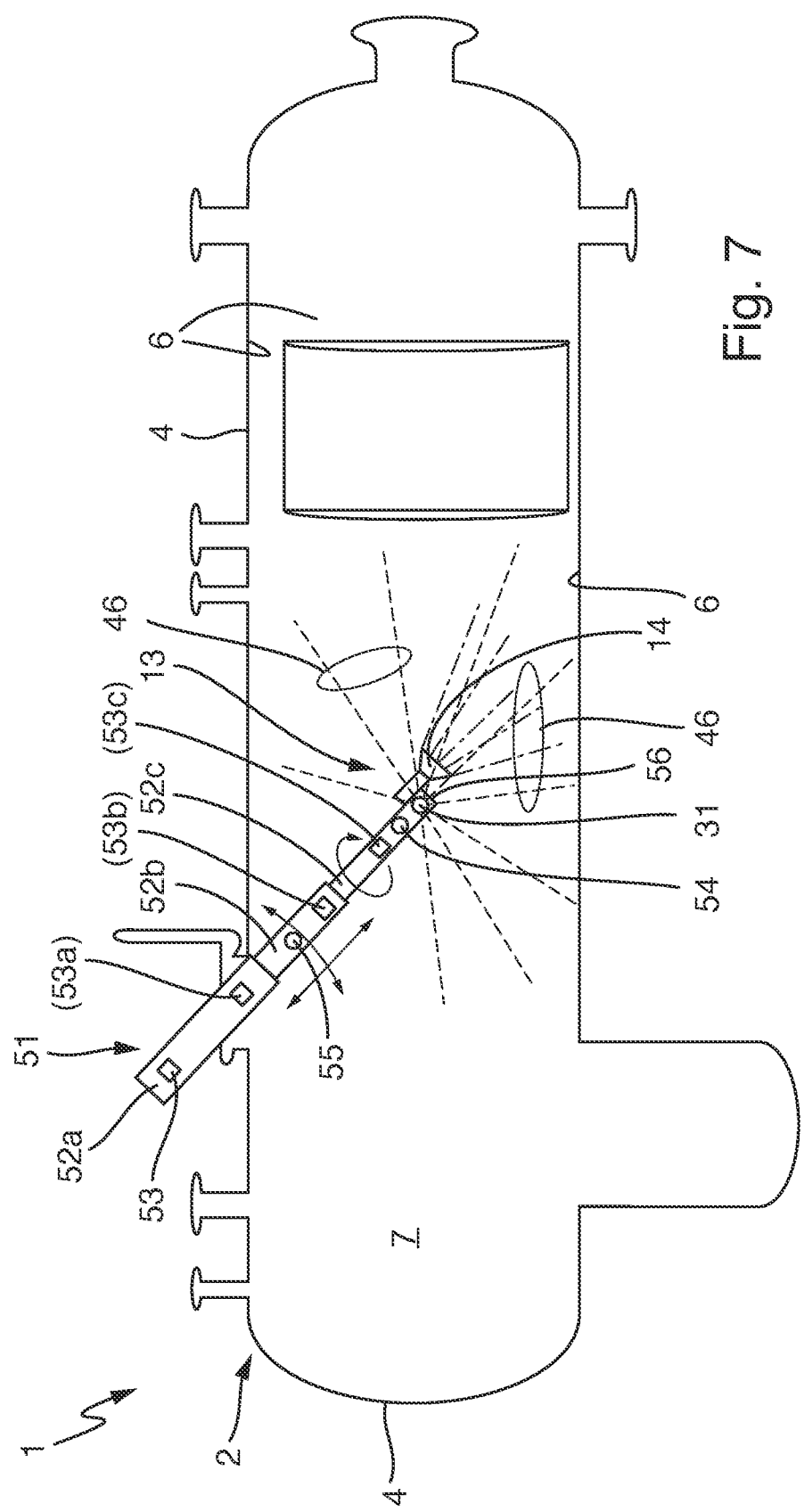
FIG. 7 is a simplified cross-sectional view of a pressure vessel having a movable pole with a camera inserted in the interior space of the pressure vessel to illustrate another embodiment of a localization system for mobile remote inspection and/or manipulation tools according to present invention.

FIG. 7 shows a remote inspection and/or manipulation system 18 according to another embodiment of present invention. The system 18 includes a hand-held pole 51 which may be inserted into the confined space 7 through the access opening 8, for example, in order to inspect the interior surfaces 6. The hand-held pole 51 may preferably be a telescoping pole having a plurality of telescoping sections 52a, 52b, 52c with one section inserted into the other in an extendable and retractable manner such that the length of the pole 51 may be increased or decreased. While three telescoping sections 52a, 52b, 52c are shown in FIG. 7, any number of the telescoping sections may be used.

A sensor 53 is provided to measure the distance from the back to the tip of the pole 51. In some embodiments multiple sensors might be used. For example, as indicated in FIG. 7, linear position sensors 53a, 53b, 53c might measure the relative position of the individual telescoping sections 52a-c relative to one another to allow to determine the entire length of the pole 51. Optionally, a rotary position sensor 54 may be provided to measure and provide signals indicative of the rotational position of a particular section, e.g. the last section 52c with the free end 56 of the pole 51 around the longitudinal axis of the pole 51 or of the entire pole 51. Additionally a gravity sensor 55 may be used in the pole 51 to measure the angle of the pole 51 with respect to gravity. An inspection camera 14 or other sensor, such as an ultrasound sensor, may be mounted on the last section 52c near the free end 56, for example, in order to inspect the interior surfaces 6 of the wall 4 of the pressure vessel 2. As an alternative or in addition, an actuator for maintaining or otherwise manipulating the interior surfaces 6 may be mounted on the last section 52c of the pole 51.

Still further, at least one laser range finder unit 29 may be positioned preferably on the last section 52c near the free end 56 of the pole 51 to measure the distance to adjacent or opposed portions of the interior surfaces 6 of the pressure vessel 2. In FIG. 7, the corresponding laser range finder (LIDAR) devices 31 or other distance measuring sensors are only indicated by the corresponding laser or light beams 46 which are emitted by the distance measuring devices.

The localization method used by the remote inspection and/or manipulation system 18 shown in FIG. 7 substantially corresponds to the localization method shown in FIG. 3, wherein instead of the pose signals provided by the IMU 28 and the rotary encoders 22 of the magnetic climbing robot 12 of FIGS. 1 and 4, now the corresponding pose signals provided by the linear, angular and rotary position sensors 53 or 53a-53c, 54, and 55 are used to estimate the current sensed pose of the free end 56 of the pole 51. The telescoping sections 52a-c (or at least the last section 52c with the free end 56 of the pole 51) may be considered forming the movable carrier, similar to the platform 24 of the climbing robot 12 of FIG. 1, which is used to carry the corresponding cameras or sensors.

A localization method and system for mobile remote inspection and/or manipulation tools in confined spaces are provided. The system 18 comprises a mobile remote inspection and/or manipulation device 3 including a carrier 24, 52a-c movable within the confined space 7 and an inspection and/or manipulation tool 13, such as an inspection camera 14, pose sensors 22, 28, 53a-c, 54 arranged on the movable carrier 24, 52a-c for providing signals indicative of the position and orientation of the movable carrier 24, 52a-c, and distance sensors 29, 31 arranged on the movable carrier 24, 52a-c for providing signals indicative of the distance to interior surfaces 6 of the confined space 7. The localization method makes use of probalistic sensor fusion of the measurement data provided by the pose sensors 22, 28, 53a-c, 54 and the distance sensors 29, 31 in order to precisely determine the actual pose of the movable carrier and localize data generated by the inspection and/or manipulation tool 13.

The invention claimed is:

1. A localization method for mobile remote inspection and/or manipulation tools in confined spaces, the method comprising the steps of:

placing a mobile remote inspection and/or manipulation device inside a confined space, the device having a carrier movable within the confined space and an inspection and/or manipulation tool mounted on the movable carrier, the inspection and/or manipulation tool including a camera providing inspection data;

arranging a number of pose sensors on the movable carrier for providing signals indicative of positions and orientations of the movable carrier;

providing a number of distance sensors—on the movable carrier;

accessing a pre-existing three-dimensional (3D) environment model of the confined space, the environment model representing at least some of the interior surfaces of the confined space;

navigating the movable carrier with the inspection and/or manipulation tool inside the confined space;

determining sensed pose data indicative of a current position and an orientation of the movable carrier within the confined space using signals received from the pose sensors;

sensing a distance to interior surfaces of the confined space using the distance sensors on the movable carrier;

simulating distance measurements as they would result from a set of candidate poses of the movable carrier using the 3D environment model, the set of candidate poses generated based on the sensed pose data;

comparing the simulated distance measurements to actual distance measurements provided by the distance sensors;

identifying the most likely pose of the movable carrier based on the comparison results;

determining a 3D pose of the movable carrier as the identified most likely pose;

calculating a tool pose of the inspection and/or manipulation tool;

localizing data recorded by the inspection and/or manipulation tool;

storing recorded inspection data with associated localization data;

storing mission data including the path of the device, the states of the tool and any annotations an operator generates during a mission together with the recorded inspection and localization data; and controlling the inspection and/or manipulation tool using the determined 3D pose of the movable carrier.

2. The method of claim 1, wherein the pre-existing 3D environment model consists of a set of connected triangles representing the interior surfaces of the confined space, wherein the 3D environment model is obtained from technical drawings of the confined space or through laser or light scanning of the confined space.

3. The method of claim 1, wherein the inspection and/or manipulation tool is an inspection sensor or camera or an actuator mounted on a robot, a manipulator arm, a hand-held pole or other device configured to bring and/or move the inspection and/or manipulation tool inside the confined space.

4. The method of claim 1, wherein the mobile remote inspection and/or manipulation device is a magnetic climbing robot configured to climb magnetic surfaces, the climbing robot including a platform comprising magnetic wheels, one or more drive motors to drive at least some of the wheels and a video camera for capturing images of the interior surfaces of the confined space.

5. The method of claim 4, wherein the magnetic climbing robot includes an inertial measurement unit arranged to measure linear acceleration along three axes and also measure rotation speed around three axes and to provide signals indicative thereof, wherein the sensed pose data of the movable carrier is determined using the measurement signals provided by the inertial measurement unit.

6. The method of claim 4, wherein providing a number of distance sensors on the movable carrier includes providing a plurality of laser range finder devices or time-of-flight cameras.

7. The method of claim 4, wherein the magnetic climbing robot includes rotary encoders mounted on shafts of the climbing robot and configured to measure and provide signals indicative of the angular position or motion of the wheels of the movable carrier, wherein the sensed pose data of the movable carrier is determined using the measurement signals provided by the rotary encoders.

8. The method of claim 7, wherein the magnetic climbing robot includes both an inertial measurement unit and at least two rotary encoders assigned to different wheels of the movable carrier, wherein the set of candidate poses is generated based on measured inertial signals received from the inertial measurement unit and measured odometry signals received from the rotary encoders and considering typical sensor noise of the inertial measurement unit and the rotary encoders.

9. The method of claim 8, wherein the mobile remote inspection and/or manipulation device is a movable pole mounting an inspection camera, the movable pole being extendable and retractable in its longitudinal direction and rotatable around its longitudinal axis, with position, angular and rotary sensors arranged on the pole to provide signals indicative of the linear and rotary position of the pole.

10. The method of claim 1, wherein generating the set of candidate poses and identifying the most likely pose include using probalistic sensor data fusion based on a Monte Carlo localization or particle filtering technique.

11. The method of claim 10, wherein the Monte Carlo localization or particle filtering technique includes an initialization step in which the initial belief is set following a normal distribution of particles in the surroundings of the place where the mobile remote device was deployed, a prediction step in which the poses of the particles are updated based on the received sensed pose data and considering typical sensor noise, an update step in which weights are assigned to each of the particles based on the simulated distance measurements and the actual distance measurements, wherein the particles which are likely to give the actual distance measurements receive a higher weight, and a resampling step in which a new set of particles is obtained by resampling the particles according to the weights.

12. The method of claim 1, displaying a 3D visualization of the area of the environment of the mobile remote device, at which the camera or sensor is focused on.

13. A localization system for mobile remote inspection and/or manipulation tools in confined spaces, the system comprising:
a mobile remote inspection and/or manipulation device including a carrier movable within the confined space and an inspection and/or manipulation tool mounted on the movable carrier within the confined space, the inspection and/or manipulation tool including a camera providing inspection data;
a number of pose sensors arranged on the movable carrier for providing signals indicative of positions and orientations of the movable carrier; a number of distance sensors arranged on the movable carrier for providing signals indicative of distances to interior surfaces of the confined space; and
a control device including processor means and a memory, the memory storing a pre-existing three-dimensional (3D) environment model of the confined space and a program code, wherein the processor means are configured to execute the program code, which when executed, cause the control device to perform operations including
accessing the pre-existing three-dimensional (3D) environment model of the confined space, the environment model representing at least some of the interior surfaces of the confined space;
controlling the movable carrier with the inspection and/or manipulation tool to navigate inside the confined space;
determining sensed pose data indicative of a current position and an orientation of the movable carrier within the confined space using signals received from the pose sensors;
sensing a distance to interior surfaces of the confined space using the distance sensors on the movable carrier;
simulating distance measurements as they would result from a set of candidate poses of the movable carrier using the 3D environment model, the set of candidate poses generated based on the sensed pose data;
comparing the simulated distance measurements to actual distance measurements provided by the distance sensors;
identifying the most likely pose of the movable carrier based on the comparison results;
determining a 3D pose of the movable carrier as the identified most likely pose;
calculating a tool pose of the inspection and/or manipulation tool;
localizing data recorded by the inspection and/or manipulation tool;
storing recorded inspection data with associated localization data;
storing mission data including the path of the device, the states of the tool and any annotations an operator generates during a mission together with the recorded inspection and localization data; and
controlling the inspection and/or manipulation tool using the determined 3D pose of the movable carrier.

14. The system of claim 13, wherein the inspection and/or manipulation tool is an actuator mounted on a robot, preferably a magnetic climbing robot, a manipulator arm, a hand-held pole or other device configured to move the inspection and/or manipulation tool inside the confined space.

* * * * *